(12) United States Patent
Lee et al.

(10) Patent No.: US 6,760,293 B2
(45) Date of Patent: Jul. 6, 2004

(54) DRIVING DEVICE AND CHASSIS FOR A DISK TRAY OF AN OPTICAL DISK DRIVE

(75) Inventors: Wei-Pang Lee, Taipei (TW); Yu-Min Chen, Taipei (TW)

(73) Assignee: Asustek Computer Inc., Taipei (TW)

(*) Notice: Subject to any disclaimer, the term of this patent is extended or adjusted under 35 U.S.C. 154(b) by 286 days.

(21) Appl. No.: 09/939,733

(22) Filed: Aug. 28, 2001

(65) Prior Publication Data

US 2002/0024911 A1 Feb. 28, 2002

(30) Foreign Application Priority Data

Aug. 30, 2000 (TW) ........................................ 89215013 U

(51) Int. Cl.[7] ............................................. G11B 33/02
(52) U.S. Cl. ................................................. 369/75.2
(58) Field of Search ............................. 369/75.2, 77.1, 369/30.96, 30.99, 30.75, 30.32; 360/97.01, 99.07, 99.06, 99.03, 99.02

(56) References Cited

U.S. PATENT DOCUMENTS 6,016,237 A * 1/2000 Mizoshita et al. ....... 360/97.01

* cited by examiner

Primary Examiner—Hoa T. Nguyen
Assistant Examiner—Julie Anne Watko
(74) Attorney, Agent, or Firm—Rabin & Berdo, P.C.

(57) ABSTRACT

A driving device and chassis for a disk tray of an optical disk drive is disclosed. The tray of the optical disk drive is connected to the chassis. The front end of the chassis is provided with a driving means. By the driving of the driving means, the disk tray may open or close. A driven wheel serves to drive a decelerating gear set. The driven wheel has a hole that receives a rotary shaft retainer with a thread portion that screws into a boss on the chassis. An upper half of said rotary shaft screw is an axial portion, that extends through the hole in the driven wheel. Alternatively, a rotary shaft retainer may integrally formed with the chassis through a rotary shaft. The chassis is made of a general material. The manufacturing process is easy and the cost of the chassis of an optical disk drive is reduced.

7 Claims, 5 Drawing Sheets

DRIVING DEVICE AND CHASSIS FOR A DISK TRAY OF AN OPTICAL DISK DRIVE

FIELD OF THE INVENTION

The present invention relates to an optical disk drive, and more particularly to a driving device and a chassis for a disk tray of the optical disk drive, which provides a structure of the chassis capable of introducing a cost-effective material.

BACKGROUND OF THE INVENTION

Referring to FIGS. 1 and 2, a structure of a conventional optical disk drive without a casing is illustrated. Other than a suction type optical disk drive, the disk tray is a necessary component of an optical disk drive. In using an optical disk drive, the disk tray needs to move out and in from a chassis for being placed or taken out an optical disk.

A disk tray 1 is connected to the chassis 2 which is mounted to the casing of the optical disk drive. In order that the disk tray 1 can be moved back and forth on the chassis 2, a power source is installed; therefore, as power is transferred through a driving means, the disk tray 1 can open and close.

In generally, the power source is a motor 4 which is connected to a driving wheel 41. The driving wheel 41 drives a driven wheel 43 through a belt 42. Then, the driven wheel 43 drives a decelerating gear set 45 through a toothed portion 44 thereof for driving the disk tray 1.

In order that the manufacturing and assembling can be made conveniently, the chassis 2 is made integrally including a protruding axial column 24 directly formed thereon at a position to support the driven wheel 43. When the driven wheel 43 is engaged with an upper end of the axial column 24, a short screw 23 is locked at a top end of the axial column 24 for preventing that the driven wheel 43 from being ejected.

This structure has a defect in that the chassis 2 must be made with a high temperature tolerable material since it is possible that an optical disk drive may be exposed to a high temperature environment, such as in operation and transportation. Therefore, in general, an optical disk drive must suffer from a test of 60 degree C. In order to prevent the axial column 24 on the chassis 2 from distortion by the pulling tension of the belt 42 and even the chassis 2 from being destroyed in a high temperature, material such as PC+ABS, GE (General Electric) NORYL (plastic), and other high temperature tolerant material, a second material, is necessary. However, the above materials are expensive, and the whole cost of the optical disk drive thus cannot be reduced. If a general ABS is used, it is possible that the axial column 24 will deform as the optical disk drive is operated. Therefore, the current optical disk drives use high cost material for the disk tray and chassis. While the profit of an optical disk drive is decreased continuously, the manufacturing cost needs to be reduced.

SUMMARY OF THE INVENTION

Accordingly, the object of the present invention is to provide a driving device and chassis for a disk tray of an optical disk drive. The rotary shaft retainer can easily be installed to the chassis and can suffer from high temperature without deformation. Through the design of the retainer, the force applied to the chassis is reduced and the ability of the chassis preventing against the torque of the tension from the belt is increased. Furthermore, the chassis of the optical disk drive can be made of a general high temperature tolerable material so that the manufacturing work is improved. The manufacturing process is easy and cost of the chassis of an optical disk drive is reduced.

In order to achieve aforesaid object, the present invention provides a rotary shaft retainer which is a rotary shaft screw. An upper half of the rotary shaft screw is an axial portion, and a lower half of the rotary shaft screw has a thread, and the axial portion of the rotary shaft screw serves to be pivotally connected to a thread of a short column protruded from the chassis. The thread is locked to a joint of the chassis; or a rotary shaft retainer is integrally formed with the chassis through a rotary shaft. The chassis is made of a general material. Furthermore, the chassis is made of a general ABS resin. The manufacturing cost can be reduced greatly. The rotary shaft retainer is a metal rotary shaft and is integrally formed with the chassis by insert molding.

The various objects and advantages of the present invention will be more readily understood from the following detailed description when reading in conjunction with the appended drawing.

DETAILED DESCRIPTION OF THE PREFERRED EMBODIMENTS

Figure 1:
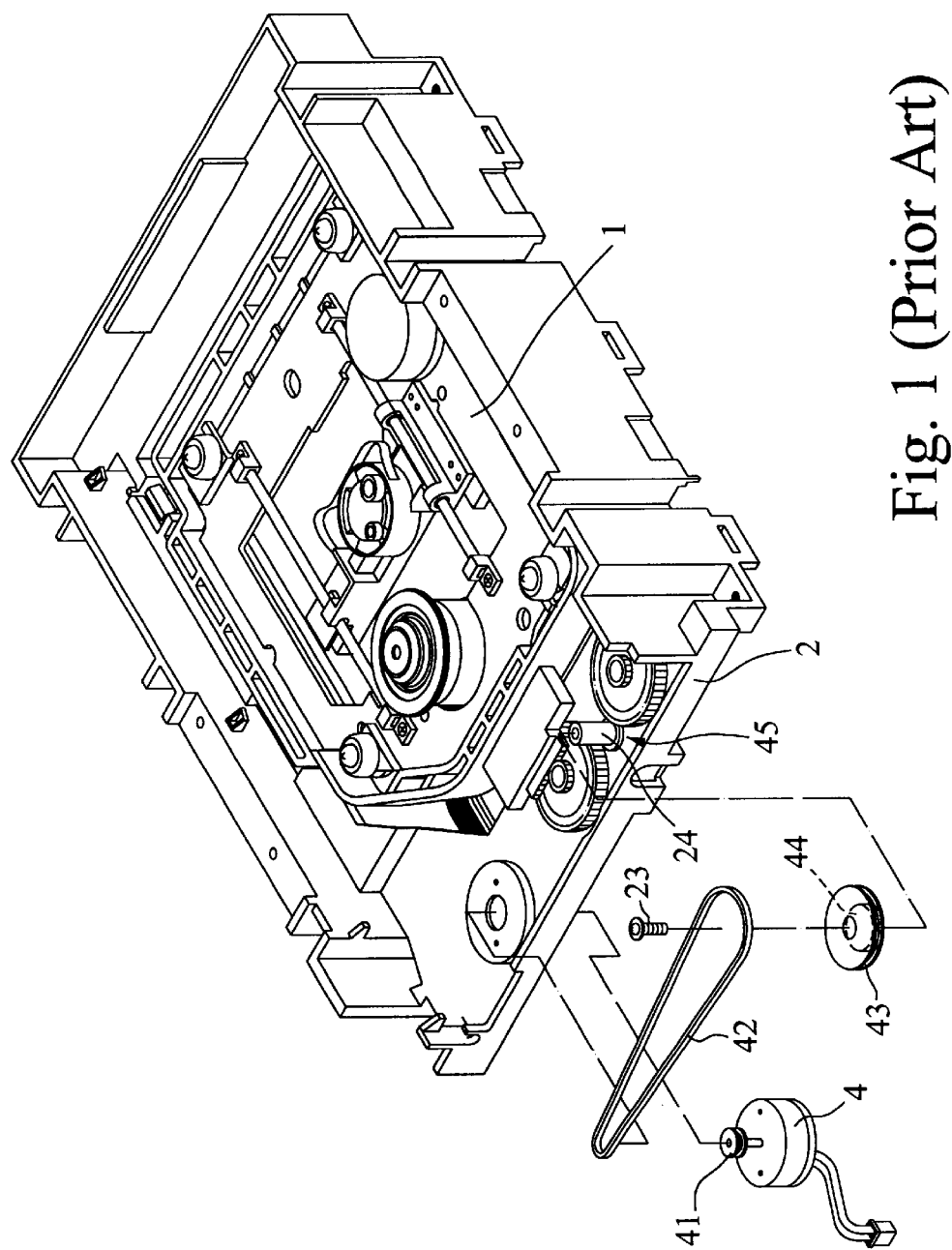
FIG. 1 is an exploded perspective view of a prior art.
Figure 2:
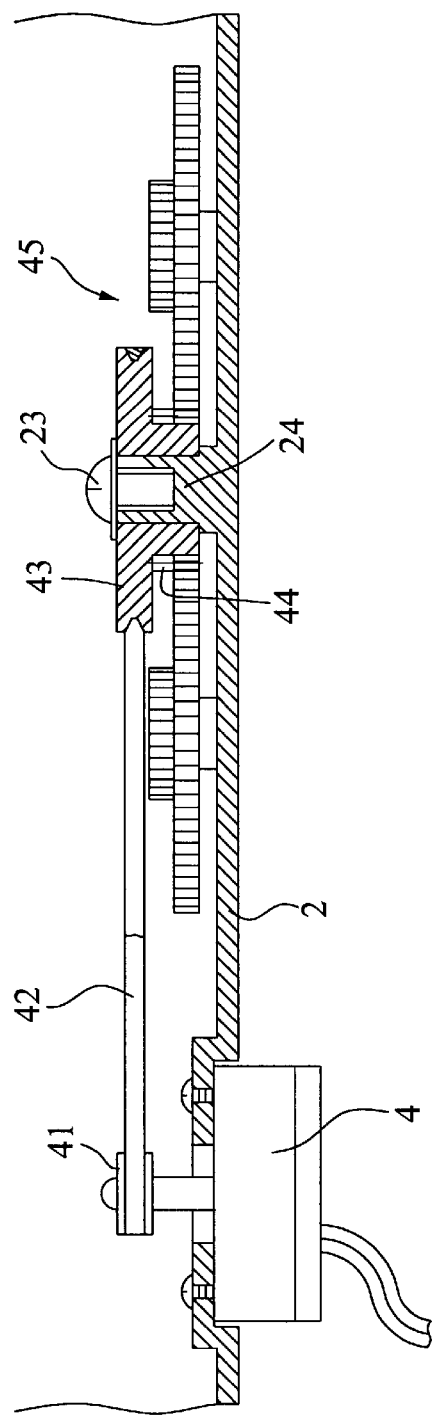
FIG. 2 is a partial cross sectional view of a prior art.
Figure 3:
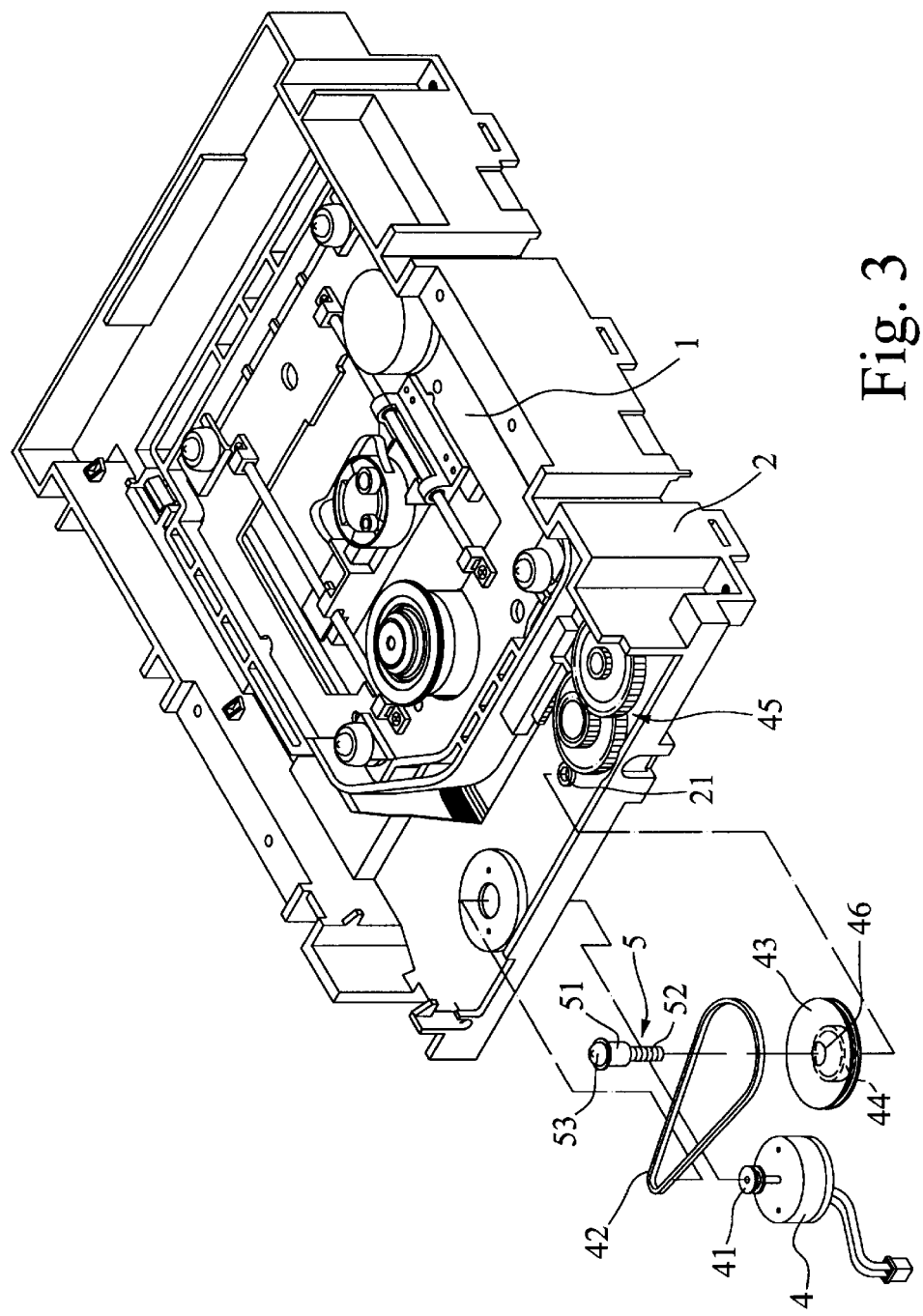
FIG. 3 is an exploded perspective view of the present invention.
Figure 4:
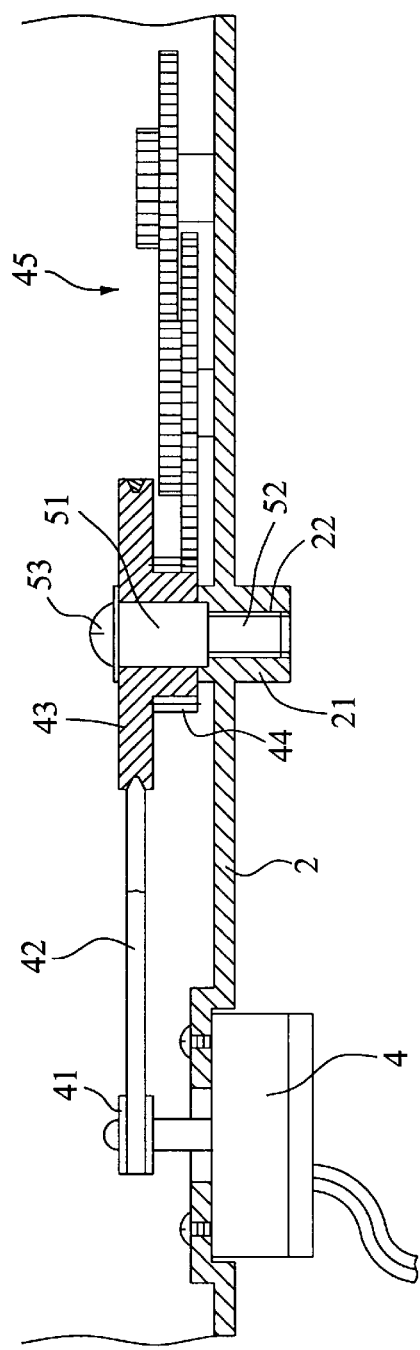
FIG. 4 is a partial cross sectional view of the present invention.

With reference to FIGS. 3 and 4, the driving device and chassis for a disk tray of an optical disk drive according to the present invention are illustrated. A driving device is installed on the chassis 2 connected to the disk tray 1. By the driving of the driving device, the tray 1 is opened or closed by a switching structure formed by a gear and a rack.

Most of the driving way of the present invention is identical to the convention. The driven means is installed in the front panel of the chassis 2, and the driving means is provided a power source, a driving piece, a driven wheel, and a decelerating gear. A penetrating hole is formed in the center of the chassis 2. A motor seat is firmly secured with a motor 4 as a power source with a plurality of screws. The rotary shaft of the motor 4 is connected to a driving wheel 41 and protrudes from the penetrating hole. The driving wheel 41 drives a driven wheel 43 through a belt 42 as a driving piece, and then further drives a decelerating gear set 45 through the teeth 44 installed in the driven wheel 43. The decelerating gear includes at least one gear.

In the present invention, the driven wheel 43 is installed with a rotary shaft retainer 5, which is made of heat tolerant material. The rotary shaft retainer 5 is installed independently. An axial hole 46 is provided at the center of the driven wheel 43, is retained by the rotary shaft retainer 5. The upper half of the rotary shaft retainer 5 has an axial portion 51. The lower half of the rotary shaft retainer 5 has a thread portion 52. The upper half of the rotary shaft retainer 5 has a head 53 with a cruciform trench or a straight slot or a hexagonal nut. Therefore, a mounting operation can be performed easily. The axial portion 51 of the rotary shaft retainer 5 extends through the axial hole 46 of the driven wheel 43, and the thread portion 52 is screwed into a boss 21 of the chassis 2. The boss 21 is formed by a short column protruding from the panel of the chassis 2. A small height of the short column is better, that is, a small torque of the belt 42 to the boss of the chassis 2 is preferable. Therefore, high temperature during transportation or exposure will not deform the boss 21 of the chassis 2.

The boss 21 and a screw hole with an inner thread 22. The Boss 21 can be formed as a hollow column as a general plastic piece. Therefore, it can be locked with a general metal thread. The rotary shaft retainer 5 is made of metal or made of heat tolerable engineering plastic. The function thereof is that the thread portion 52 at the lower section of the rotary shaft retainer 5 resists against the torque from the tension of the belt 42. Therefore, the longer the thread portion 52, the stronger the torque. Therefore, in the present invention, due to the rotary shaft retainer 5, the restriction on the material of the chassis 2 is released.

Figure 5:
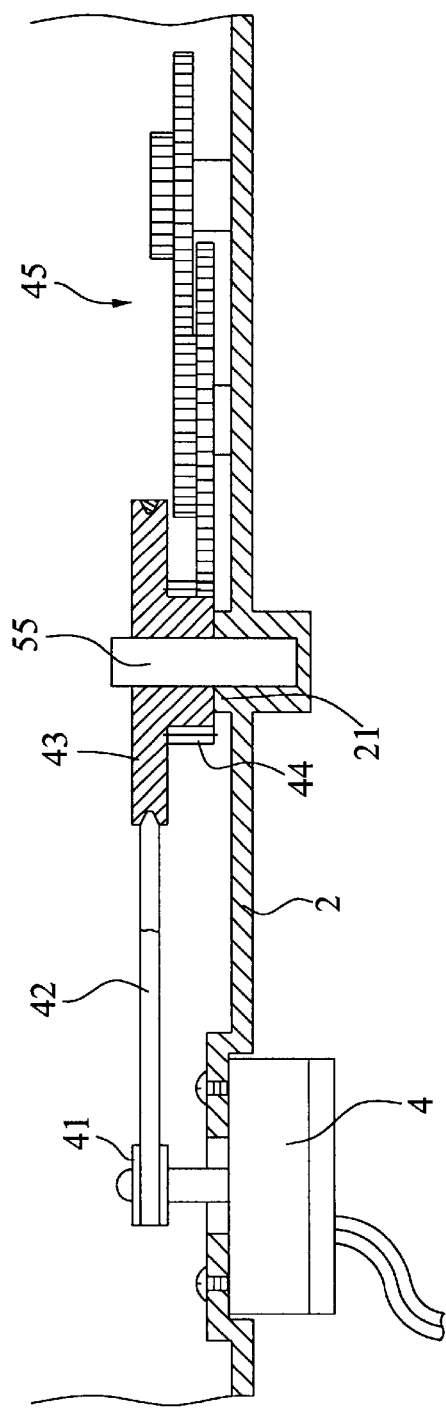
FIG. 5 is an assembled cross sectional view of another embodiment in the present invention.

In summary, in the present invention, by the special design of the prior art rotary shaft screw, other than the function of locking and pivotally connecting a driven wheel, the present invention can be made of metal or engineer plastics. Not only the high rigidity of the metal itself may be used to resist against the tension of the belt 42, but also the prolonged thread portion 52 can be used to reduce the force applied to the chassis 2. Similarly, as shown in FIG. 5, the rotary shaft retainer may be a metal rotary shaft 55. Namely, a metal rotary shaft 55 is used to substitute the rotary shaft retainer 5. The metal rotary shaft 55 can be connected to a mold of the chassis 2 by insert molding so that the metal rotary shaft 55 and the chassis 2 are formed integrally. Thus, the same effect is formed. More importantly, the aforesaid improvement can achieve the primary object of the present invention. Furthermore, the chassis can be made of plastic material with a lower heat tolerance, such as ABS (first material) so as to reduce the whole manufacturing cost and thus the cost is reduced. According to an initial calculation, the manufacturing cost of 50% can be reduced. Therefore, such an improvement can provide a tolerable product and is different from the prior art designs.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A driving device and chassis for a disk tray of an optical disk drive comprising:

driving means having a power source, a driving device, a driven wheel and a decelerating gear set;

a chassis connected with a tray at a inner space thereof; said chassis being connected to said driving means; and said chassis being made of a first material; wherein said power source is firmly secured to said chassis; a driving wheel is connected to said power source; said driving wheel drives said driven wheel, and then said driven wheel further drives said decelerating gear set; and an axial hole is provided in said driven wheel;

a rotary shaft retainer that is connected to said chassis; said rotary shaft retainer being made of a second high temperature-tolerable material; and said rotary shaft retainer extends through said axial hole of said driven wheel to rotatably mount said driven gear; and said tray being placed adjacent an optical head, said tray being driven by said decelerating gear of said driving means so as to be opened or closed.

2. The driving device and chassis for a disk tray of an optical disk drive as claimed in claim 1, wherein said rotary shaft retainer has an upper half configured as an axial portion, and a lower half configured as a thread portion, and the axial portion of the rotary shaft retainer extends through said axial hole of said driven wheel and said thread portion is screwed into a short column protruding from said chassis.

3. The driving device and chassis for a disk tray of an optical disk drive as claimed in claim 2, wherein said rotary shaft retainer is made of a metal material.

4. The driving device and chassis for a disk tray of an optical disk drive as claimed in claim 2, wherein said rotary shaft retainer is made of a high temperature tolerant engineering plastic.

5. The driving device and chassis for a disk tray of an optical disk drive as claimed in claim 1, wherein said rotary shaft retainer is a metal rotary shaft retainer, said metal rotary shaft being integrally formed with said chassis by insert molding.

6. The driving device and chassis for a disk tray of an optical disk drive as claimed in claim 1, wherein said first material is ABS.

7. The driving device and chassis for a disk tray of an optical disk drive as claimed in claim 1, wherein the second material is PC+ABS.

* * * * *